Patented Feb. 21, 1950

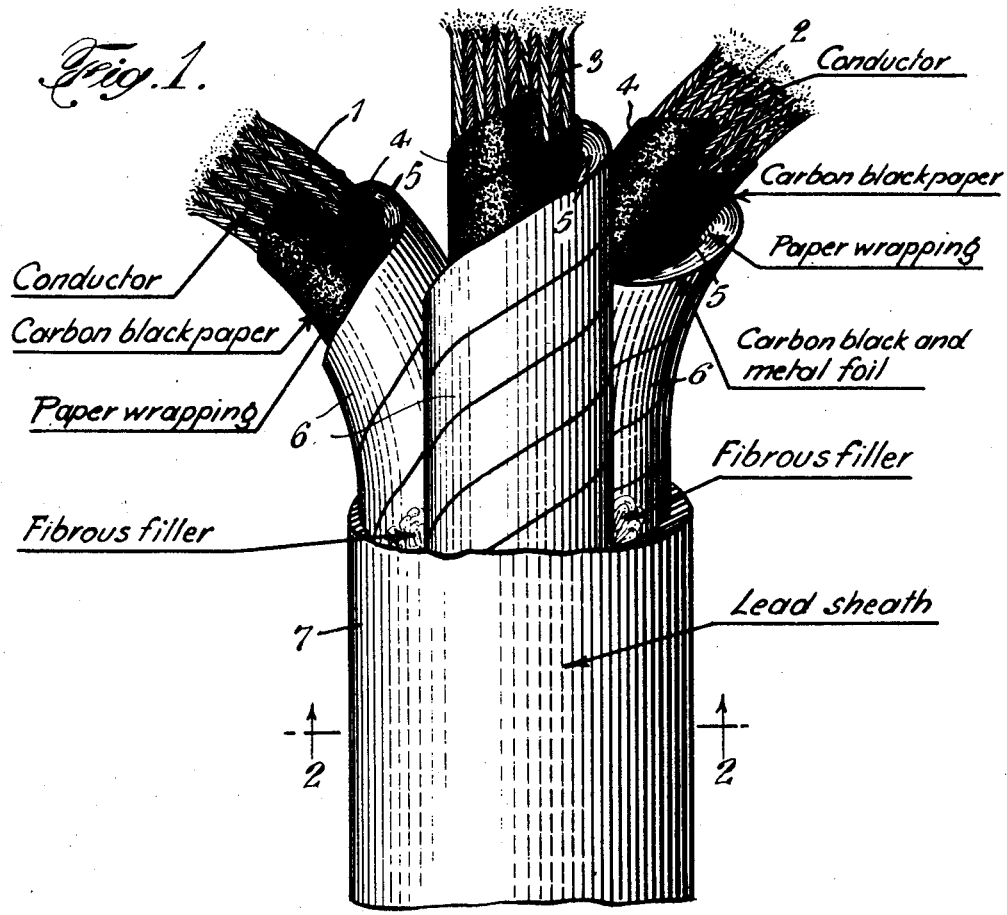
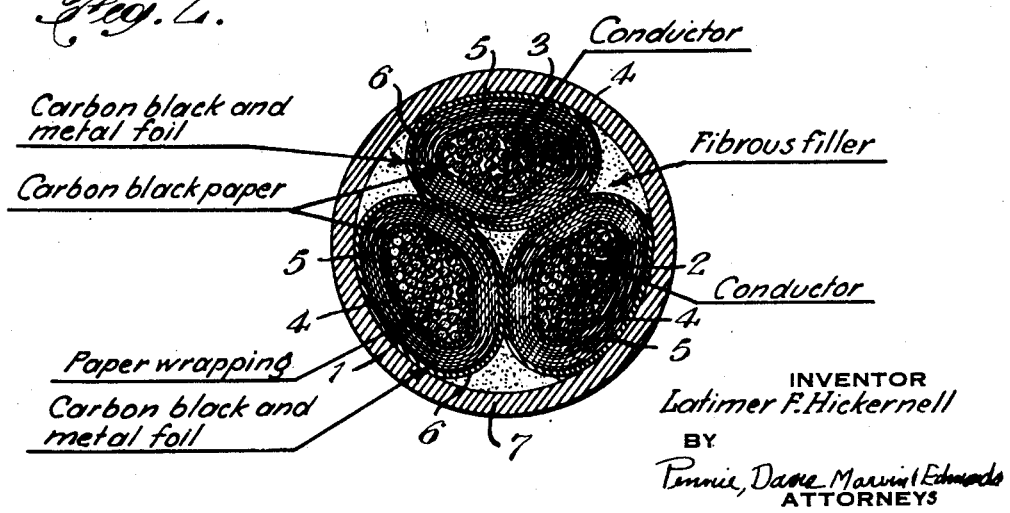

2,498,494

UNITED STATES PATENT OFFICE 2,498,494

ELECTRICAL CABLE

Latimer F. Hickernell, Irvington, N. Y., assignor to Anaconda Wire and Cable Company, a corporation of Delaware Application June 22, 1945, Serial No. 600,996

2 Claims. (Cl. 174—26)

This invention relates to electrical conductors, and especially to power cables of the type having an exterior metal sheath and one or more interior conductors with insulation impregnated with an insulating liquid, such as oil. More particularly, the invention pertains to power cables having adsorbing carbon in the insulation to adsorb impurities from the oil, and has for its object the provision of an improved cable of this character.

High voltage power cables, and especially those having two or more separately insulated conductors within a single sheath, require close observation during use to prevent heavy damage to manholes and duct systems and to safeguard the electrical apparatus at the power station against short circuits between phases within one cable and between the cable and ground. Very sensitive apparatus is used to detect incipient current leakages through the insulation so that the cable may be repaired before a complete breakdown of the insulation between conductors results. It is one of the principal objects of the invention to provide a cable of the type described having means in combination with the sheath and insulation for facilitating the detection of current losses through the insulation. Phase to phase faults can be extremely destructive. Phase to ground faults are less destructive. The relay system described above isolates the cable before a phase to phase fault can develop.

I have discovered a composite sheet comprising paper, impregnated with adsorbing carbon such as carbon black, bonded to a metal foil with an adhesive of such low resistivity that current flows readily through the composite sheet transversely which is the subject of my copending application Serial No. 600,995, filed June 22, 1945. In this invention I provide an improved cable having one or more conductors each insulated with a fibrous material impregnated with an insulating liquid such as oil, having a layer or wrapping of my composite sheet over the insulation of each conductor and with the metal foil in either direct contact with the usual surrounding outside metal sheath or in contact with the sheath through other conducting tapes.

My electrically conducting composite sheet, or tape, as disclosed in the above-identified copending application, comprises a layer of carbon-impregnated, current-conducting paper bonded to a layer of aluminum or other metallic foil by means of a current-conducting adhesive. The resulting composite sheet or tape is consequently a good conductor of electric current both longitudinally and transversely. The carbon-impregnated paper used is of the type impregnated with adsorptive carbon black described in United States patent to Samuel J. Rosch No. 2,102,129. The adhesive used to bond the carbon black paper to the metallic foil comprises a resinous or other adhesive base in which there is dispersed an appreciable amount of finely divided carbon, for example graphite, acetylene or channel black in an amount ranging from 1% to 50% by weight of the adhesive.

Advantageously I may apply a layer of carbon black impregnated paper directly over the conductor, and the adsorbent carbon is accordingly in contact with the oil on both sides of the insulation. The foil occupying the exterior position on each conductor is in good electrical contact with the close fitting metal sheath which is usually formed of lead. By reason of the high transverse electrical conductivity of the composite sheet, even incipient current flow through the oil-impregnated insulation can flow through the sheet and into the lead sheath. By means of the detecting apparatus usually employed with such cables, incipient current losses due to an insulation fault can be detected at its very beginning and the cable disconnected from service and repaired, thus averting a major breakdown of the cable system.

The invention will be better understood after considering the following discussion taken in conjunction with the accompanying drawings, in which:

Fig. 1 is a side view of a cable of the invention with interior parts exposed to view; and Fig. 2 is a cross-sectional view of the cable of Fig. 1.

The cable illustrated in the drawing is of the type used for underground power transmission at high voltage and comprises three separate conductors 1, 2 and 3 for a three-phase power line, each of which has a sector cross-sectional configuration for the purpose of forming a compact aggregate with a more or less circular exterior. Each conductor is covered with a helical wrapping of plain carbon black impregnated paper 4 and several wrappings of ordinary insulating paper forming the layer 5. Each layer of insulating paper is surrounded with a helical wrapping of a tape 6 formed of my composite sheet which comprises paper impregnated with carbon black bonded to an aluminum foil with an adhesive of low electrical resistivity. The three conductors thus insulated and arranged as shown are covered with an extruded sheath of lead 7.

Any suitable fibrous insulating material may be used as a substitute for the layer of insulating paper 5 and the insulating material is impregnated with a purified insulating oil. It is well known in the art that the insulating oil undergoes certain changes, presumably by contacting the metal, with the formation of certain undesirable impurities and that the carbon black of the paper serves as an absorbing or adsorbing medium for the removal of these impurities. While the layer of carbon black paper 4 is advantageous in prolonging the life of the conductor by serving as a protecting barrier between the oil-impregnated insulation 5 and the metal conductor 1, it is not essential to the purpose of this disclosure.

It is one of the characteristic and important features of my invention that the composite sheet or tape of carbon black and metal foil 6 is applied over the layer of insulation 5 with the carbon black paper in contact with the insulation and the layer of foil in an exterior position and in contact with the inner surface of the close fitting lead sheath 7.

In high voltage power cables of the type to which this invention is directed, it is not uncommon for the layer of impregnated insulation 5 to undergo strains or changes in structure resulting in incipient current losses which may persist for some time and ultimately puncture the insulation. Such punctures may form between the sectors and cause a short circuit with resulting heavy, destructive damage and fire in the duct system or in the station apparatus, and the like. The puncture may, however, be more in direct line with the lead sheath with the result that current flows from one of the conductors through the lead sheath and to ground.

The cable of the invention permits the use of very sensitive ground circuit apparatus for detecting and locating these incipient losses of current so that the defect may be corrected well in advance of any major breakdown. The composite sheet is a good conductor of electricity in its transverse direction and the entire wrapping of tape 6 is, accordingly, a good conductor of electricity and permits the flow of even very feeble currents from one of the conductors through the insulation 5 and the sheath 7. It will be apparent, therefore, that, regardless of what particular section of the insulation 5 that the current may start to flow through, it will not be appreciably impeded by contacting the layer of composite tape 6 and may flow therethrough and into contact with the sheath 7.

It is common practice to use apparatus at the power station to operate circuit breakers to disconnect one or more of the separate phase conductors as a result of failure to the insulation. One form of such apparatus is described in the Relay Hand Book and Supplement (1931 edition, published by N. E. L. A.) at page 90. In the standard ground circuit protection for power cables, each of the three phases of the line is connected to a circuit breaker and the lead sheath is connected to a relay system that operates the circuit breaker to cut out any of the conductors in which a loss occurs. One of the particularly objectionable features which may easily be detected in a cable of the invention is a fault causing a flow of current from one sector to another. Heretofore, such faults usually resulted in a short circuit without previous detection. The composite conducting layer of my invention directs the initial flow of current into the sheath and the fault is instantly detected by operation of the circuit breaker.

I claim:

1. A power cable having an exterior metal sheath and one or more conductors therein which comprises a layer of fibrous insulation impregnated with an insulating oil over the conductor, a layer of composite sheet material over the insulation, said composite sheet being electrically conducting both longitudinally and transversely and presenting an adsorptive medium for the insulating oil and comprising a sheet of paper impregnated with adsorbent carbon to provide the adsorptive medium for impurities in the oil and a metal foil bonded to the adsorptive carbon-impregnated paper with a current conducting adhesive having particles of carbon dispersed therein in an amount ranging from 1% to 50% by weight of the adhesive, said paper being in contact with the insulation and said metal foil being in contact with said metal sheath.

2. A power cable having an exterior metal sheath and a plurality of separate conductors therein which comprises a layer of insulation over each conductor impregnated with an insulating oil, a layer of composite sheet material over the insulation of each conductor, said composite sheet being electrically conducting both longitudinally and transversely and presenting an adsorptive medium for the insulating oil and comprising a sheet of paper impregnated with adsorbent carbon to provide the adsorptive medium for impurities in the oil and a metal foil bonded to the adsorptive carbon-impregnated paper with an adhesive composition rendered electrically conducting by dispersion therein of carbon particles in an amount ranging from 1% to 50% by weight of the adhesive, the paper of each layer of composite sheet material being in contact with the insulation and the metal foil of each layer of composite sheet material being in contact with the metal sheath and with the metal foil of an adjacent conductor.

LATIMER F. HICKERNELL.

REFERENCES CITED

The following references are of record in the file of this patent:

UNITED STATES PATENTS

| Number | Name | Date |
|---|---|---|
| 2,019,297 | Faucett | Oct. 29, 1935 |
| 2,102,129 | Rosch | Dec. 14, 1937 |
| 2,233,206 | Frederick | Feb. 25, 1941 |
| 2,315,039 | Beede | Mar. 30, 1943 |

FOREIGN PATENTS

| Number | Country | Date |
|---|---|---|
| 401,001 | Great Britain | Nov. 6, 1933 |